United States Patent
Bolukbasi et al.

(10) Patent No.: US 10,370,092 B2
(45) Date of Patent: Aug. 6, 2019

(54) VEHICLE LOAD-LIMITING SUSPENSION APPARATUS AND CONTROL METHODS THEREFOR

(71) Applicant: The Boeing Company, Chicago, IL (US)

(72) Inventors: Akif O. Bolukbasi, Mesa, AZ (US); Timothy R. Gleason, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 15/239,294

(22) Filed: Aug. 17, 2016

(65) Prior Publication Data

US 2018/0050794 A1 Feb. 22, 2018

(51) Int. Cl.
| | | |
|---|---|---|
| *B64C 27/00* | (2006.01) | |
| *B64D 11/06* | (2006.01) | |
| *B64C 25/58* | (2006.01) | |
| *F16F 7/00* | (2006.01) | |
| *F16F 7/12* | (2006.01) | |
| *B64D 45/00* | (2006.01) | |

(52) U.S. Cl.
CPC .......... *B64C 27/001* (2013.01); *B64C 25/58* (2013.01); *B64D 11/0619* (2014.12); *B64D 45/00* (2013.01); *F16F 7/003* (2013.01); *F16F 7/12* (2013.01); *F16F 7/125* (2013.01); *B64C 27/006* (2013.01); *B64C 2027/002* (2013.01); *B64C 2027/004* (2013.01); *B64D 2045/0085* (2013.01); *F16F 2230/18* (2013.01)

(58) Field of Classification Search
USPC .......................................................... 701/3
See application file for complete search history.

(56) References Cited

U.S. PATENT DOCUMENTS

| | | | |
|---|---|---|---|
| 5,927,646 A | | 7/1999 | Sandy et al. |
| H001833 H | * | 2/2000 | Hoppel ..................... 188/377 |
| 6,328,259 B1 | * | 12/2001 | Bolukbasi ............... B64C 25/60 |
| | | | 188/371 |
| 2008/0156602 A1 | * | 7/2008 | Hiemenz .............. B60N 2/4242 |
| | | | 188/267.1 |
| 2015/0041584 A1 | * | 2/2015 | Lu ......................... B64D 25/00 |
| | | | 244/100 A |
| 2015/0239554 A1 | | 8/2015 | Birchette et al. |
| 2017/0106981 A1 | | 4/2017 | Bolukbasi et al. |

FOREIGN PATENT DOCUMENTS

EP     2 368 797     9/2011

OTHER PUBLICATIONS

European Patent Office, "Extended European Search Report," App. No. 17172646.6 (dated Mar. 16, 2018).

* cited by examiner

*Primary Examiner* — James M McPherson
(74) *Attorney, Agent, or Firm* — Walters & Wasylyna LLC

(57) ABSTRACT

A vehicle load-limiting suspension apparatus comprises at least one shear tab for controlling an amount of impact load applied to a vehicle structure when a vehicle impact event occurs. The vehicle load-limiting suspension apparatus further comprises at least one crush tube for limiting the amount of impact load applied to the vehicle structure after the at least one shear tab shears in response to occurrence of the vehicle impact event.

22 Claims, 9 Drawing Sheets

VEHICLE LOAD-LIMITING SUSPENSION APPARATUS AND CONTROL METHODS THEREFOR

GOVERNMENT CONTRACT

This invention was made with government support under contract number W911W6-10-2-2003 awarded by the United States Army. The government has certain rights in this invention.

FIELD

The present application relates to vehicle active crash protection systems, and is particularly directed to vehicle load-limiting suspension apparatus and control methods therefor.

BACKGROUND

An active damper for an aircraft landing gear is one type of load-controlled suspension element for a vehicle active crash protection system. The landing gear absorbs some or all of the impact energy in an aircraft event such as a hard landing or a crash. A controller controls a damper valve to vary a damping coefficient of the active damper and the corresponding damper loads. Vehicle sensors are continuously monitored by the active crash protection system, and the damper valve is adjusted to maintain a target damper load for the associated landing gear of the aircraft. The target landing gear damper loads are based on aircraft gross weight and severity of the hard landing or crash event.

An active seat energy absorber for an aircraft seat is another type of load-controlled suspension element for a vehicle active crash protection system. The seat energy absorber absorbs some or all of the impact energy imparted to the aircraft seat and limits the loads experienced by occupants during an aircraft event such as a hard landing or a crash. A controller controls an actuator that is coupled to the seat energy absorber. The actuator is controlled to adjust the seat energy absorber load based on weight of an occupant in the aircraft seat, available seat stroke, and severity of the hard landing or crash event.

The above damper and seat energy absorber are only example applications of load-controlled suspension elements of vehicle active crash protection systems. Other applications of load-controlled suspension elements are possible for other types of vehicle active crash protection systems. It would be desirable to provide load-controlled suspension elements that are suitable for a wide range of applications in different types of vehicle active crash protection systems.

SUMMARY

In one aspect, a method comprises controlling an amount of impact load applied to a vehicle structure during a vehicle impact event, and limiting the amount of impact load applied to the vehicle structure while the impact energy of the vehicle impact event is being absorbed.

In another aspect, a vehicle load-limiting suspension apparatus comprises at least one shear tab for controlling an amount of impact load applied to a vehicle structure when a vehicle impact event occurs. The vehicle load-limiting suspension apparatus further comprises at least one crush tube for limiting the amount of impact load applied to the vehicle structure after the at least one shear tab shears in response to occurrence of the vehicle impact event.

In yet another aspect, a vehicle load-limiting suspension apparatus comprises a suspension element connectable between a fixed portion of a vehicle structure and a movable portion of the vehicle structure. The vehicle load-limiting suspension apparatus further comprises a plurality of sensors for detecting an impending vehicle impact event. The vehicle load-limiting suspension apparatus also comprises a controller for controlling the suspension element to control and limit impact load applied to the vehicle structure in response to the plurality of sensors detecting an impending vehicle impact event.

Other aspects will become apparent from the following detailed description, the accompanying drawings and the appended claims.

DETAILED DESCRIPTION

The present application is directed to vehicle load-limiting suspension apparatus and control methods therefor. The specific vehicle load-limiting suspension apparatus, control methods, and the industry in which the vehicle suspension apparatus and control methods are implemented may vary. It is to be understood that the disclosure below provides a number of embodiments or examples for implementing different features of various embodiments. Specific examples of suspension elements and arrangements are described to simplify the present disclosure. These are merely examples and are not intended to be limiting.

By way of example, the disclosure below describes vehicle load-limiting suspension apparatus and control methods implemented by the Boeing Corporation for aircraft in compliance with Federal Aviation Administration (FAA) regulations and military standards. Specifications of FAA regulations and military standards for crashworthy designs of vehicles are known and, therefore, will not be described.

Figure 1:
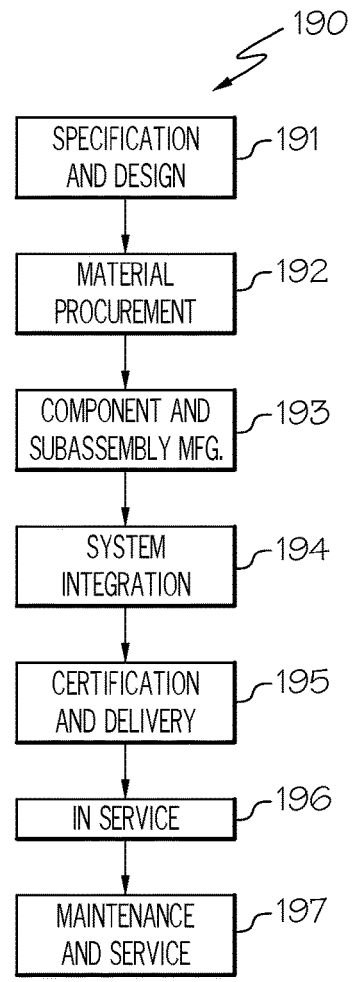
FIG. 1 is a flow diagram of an aircraft manufacturing and service methodology.
Figure 2:
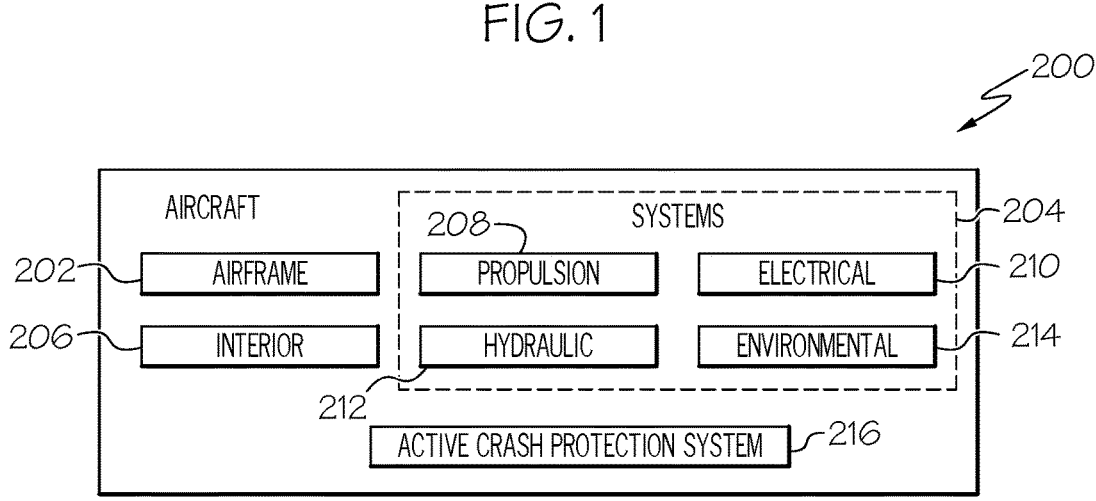
FIG. 2 is a block diagram of an aircraft.

Examples of the present disclosure may be described in the context of an aircraft manufacturing and service method 190 as shown in FIG. 1 and an aircraft 200 as shown in FIG. 2. During pre-production, the illustrative method 190 may include specification and design, as shown at block 191, of the aircraft 200 and material procurement, as shown at block 192. During production, component and subassembly manufacturing, as shown at block 193, and system integration, as shown at block 194, of the aircraft 200 may take place. Thereafter, the aircraft 200 may go through certification and delivery, as shown block 195, to be placed in service, as shown at block 196. While in service, the aircraft 200 may be scheduled for routine maintenance and service, as shown at block 197. Routine maintenance and service may include modification, reconfiguration, refurbishment, etc. of one or more systems of the aircraft 200.

Each of the processes of illustrative method 190 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 200 produced by illustrative method 190 (FIG. 1) may include an airframe 202 with a plurality of high-level systems 204 and an interior 206. Examples of high-level systems 204 may include one or more of propulsion system 208, electrical system 210, hydraulic system 212, environmental system 214, and vehicle active crash protection system (ACPS) 216 that includes the vehicle load-limiting suspension apparatus as well as active landing gear and seats. Any number of other systems may be included. Although an aerospace example is shown, the principles disclosed herein may be applied to other industries, such as the automotive and marine industries. Accordingly, in addition to the aircraft 200, the principles disclosed herein may apply to other vehicles (e.g., land vehicles, marine vehicles, space vehicles, etc.).

The vehicle load-limiting suspension apparatus and control methods disclosed herein may be employed during any one or more of the stages of the manufacturing and service method 190. For example, components or subassemblies corresponding to component and subassembly manufacturing (blocks 193 and 194) may embody the disclosed vehicle load-limiting suspension apparatus and control methods. However, the disclosed vehicle load-limiting suspension apparatus and control methods may be especially utilized, for example and without limitation, while aircraft 200 is in service (block 196).

Figure 3:
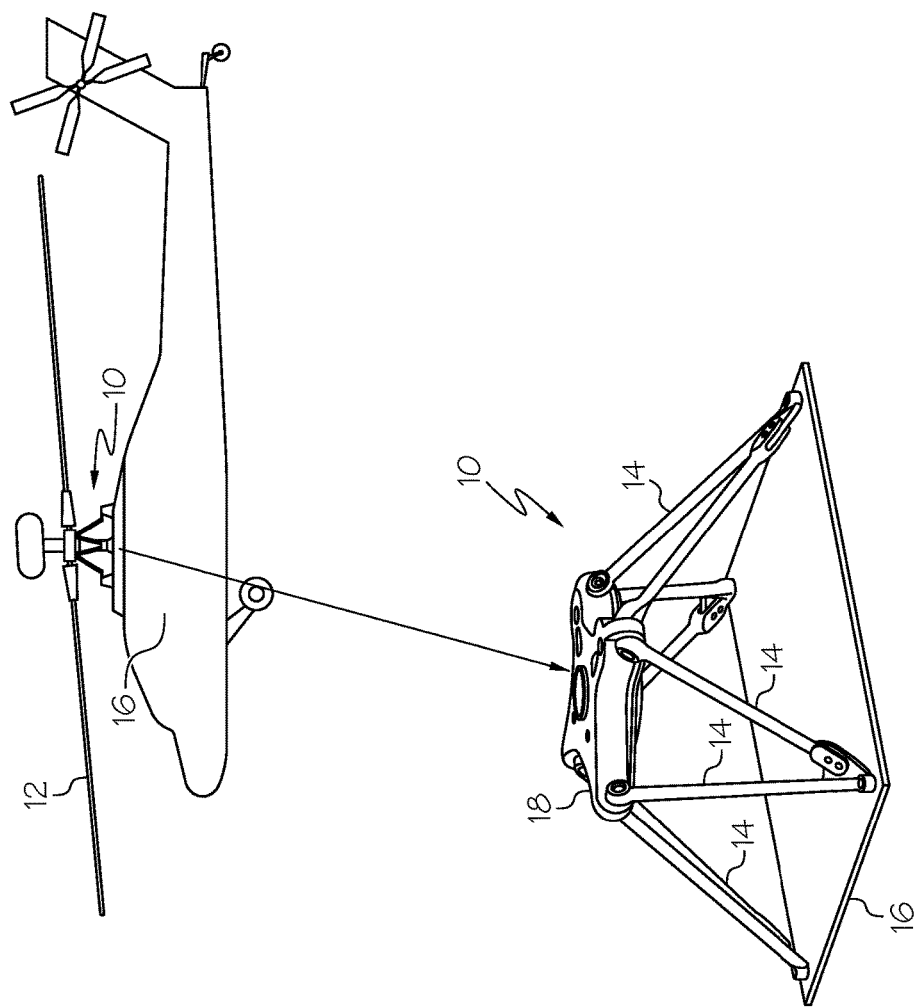
FIG. 3 is a perspective view of a known transmission support structure.

Referring to FIG. 3, a known transmission support structure, generally designated 10, supports an aircraft rotor system 12. The transmission support structure 10 includes a number of rigid elements 14 interconnected between aircraft fuselage 16 and plate 18. Plate 18 supports rotor system 12.

Figure 4:
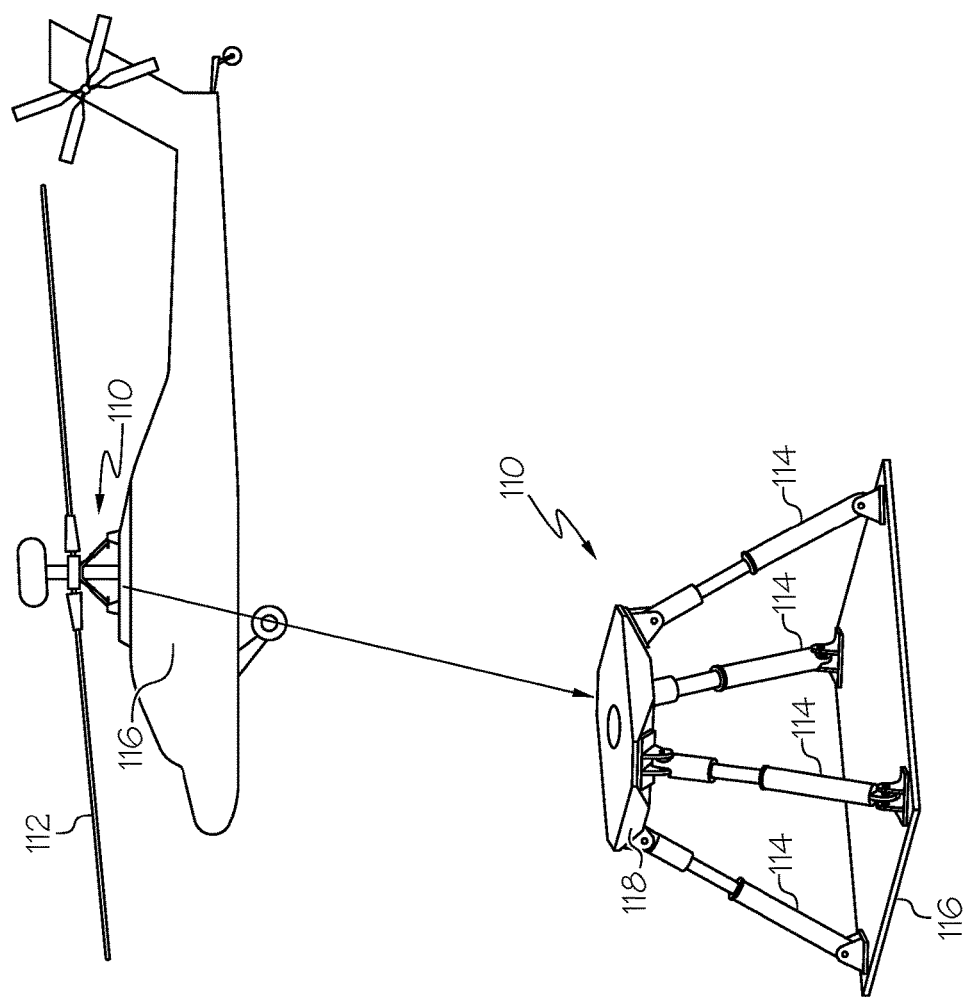
FIG. 4 is a perspective view of a transmission support structure embodying a load-controlled suspension element constructed in accordance with an embodiment.

Referring to FIG. 4, a perspective view of transmission support structure 110 embodying a load-controlled suspension element constructed in accordance with an embodiment is illustrated. Transmission support structure 110 supports aircraft rotor system 112 and includes a number of suspension elements 114 interconnected between aircraft fuselage 116 and plate 118. Plate 118 supports aircraft rotor system 112. Plate 118 is movable portion of the aircraft, and aircraft fuselage 116 is fixed portion of the aircraft. Although only four suspension elements 114 are shown in the example implementation of FIG. 4, it is conceivable that any number of suspension elements may be used.

Figure 5:
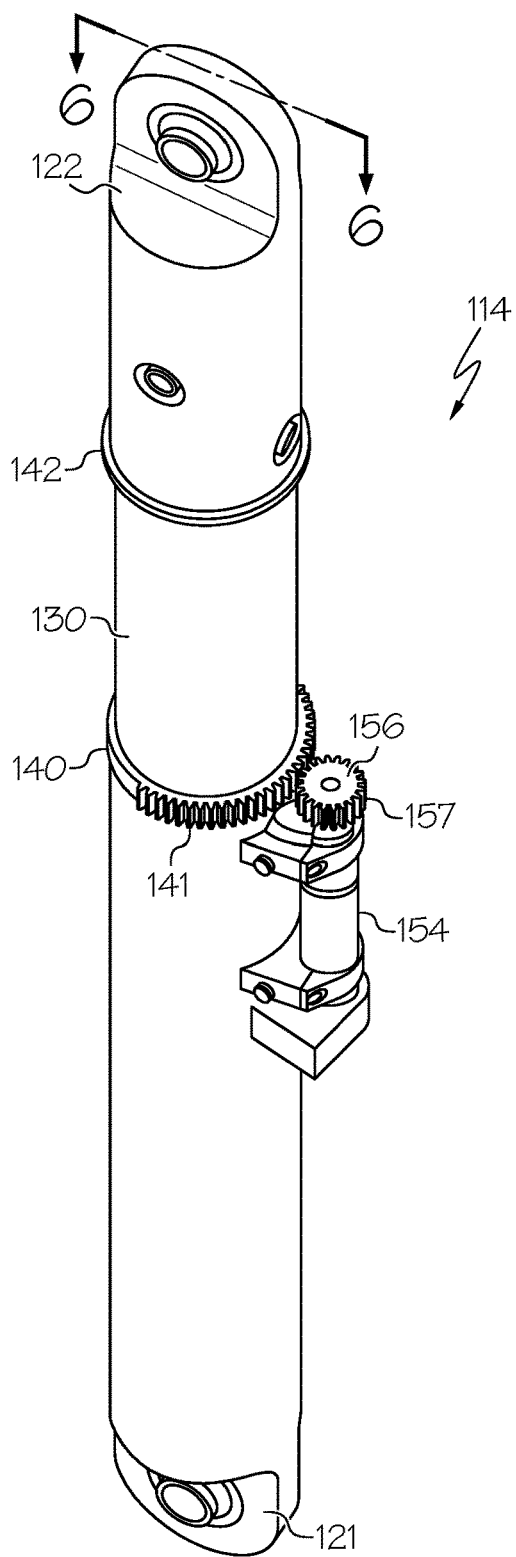
FIG. 5 is an enlarged perspective view of the suspension element of FIG. 4.
Figure 6:
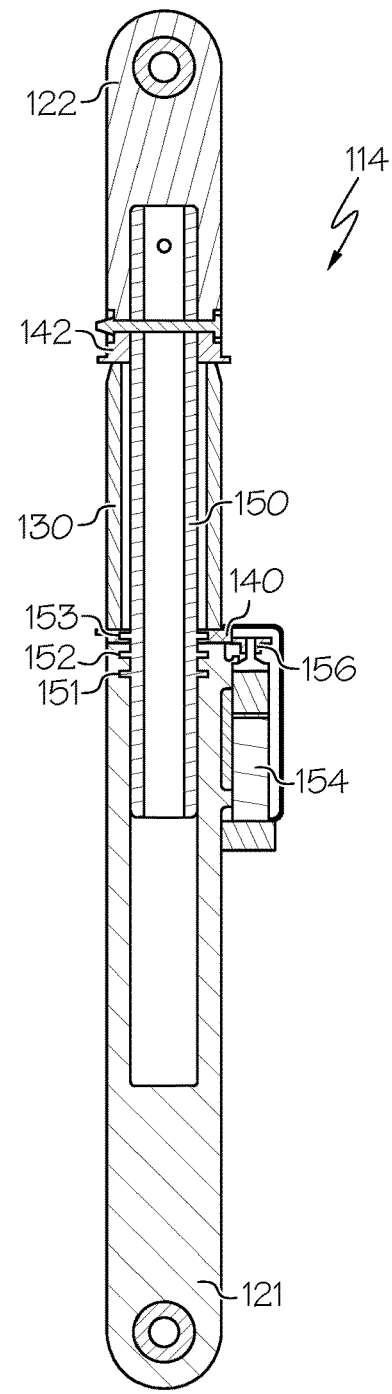
FIG. 6 is a sectional view taken approximately along line 6-6 shown in FIG. 5.

Referring to FIG. 5, an enlarged perspective view of suspension element 114 of FIG. 4 is illustrated. FIG. 6 is a sectional view taken approximately along line 6-6 shown in FIG. 5. Suspension element 114 includes first end portion 121 connectable to aircraft fuselage 116, and second end portion 122 connectable to plate 118. First end portion 121 and second end portion 122 may comprise aluminum, steel, titanium, or fiber-reinforced composite materials. These materials are only examples. Other materials are possible. It is conceivable that both first and second end portions 121, 122 comprise the same material.

Crush tube 130 is disposed between first and second end portions 121, 122. More specifically, one end of crush tube 130 abuts against shear collar 140 that is located between crush tube 130 and first end portion 121 of suspension element 114. The other end of crush tube 130 abuts against a flange member 142 that is located between crush tube 130 and second end portion 122 of suspension element 114. Crush tube 130 may be formed from various materials or combinations of materials. As an example, crush tube 130 may comprise fiber-reinforced composite material. Gear teeth 141 are disposed on a portion of the outer circumferential surface of shear collar 140.

Tubular member 150 (FIG. 6) is concentrically disposed within crush tube 130 as shown in FIG. 6. Tubular member 150 includes first, second, and third shear tabs 151, 152, 153 disposed on an outer circumferential surface of tubular member 150. The position of each of first shear tab 151 and second shear tab 152 is fixedly engaged relative to each other. The position of third shear tab 153 is adjustable and variably engaged relative to the position of first and second shear tabs 151, 152.

Figure 7A:
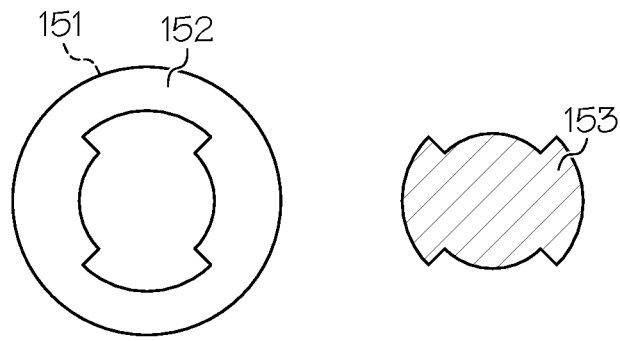
FIG. 7A shows shapes and constructions of shear tabs in accordance with an embodiment.

As an example, FIG. 7A shows shapes and constructions of the three shear tabs 151, 152, 153 in accordance with an embodiment. First shear tab 151 is depicted by a dashed reference line since first shear tab 151 is positioned exactly beneath second shear tab 152. The shear tabs 151, 152, 153 overlap each other to provide variable engagement therebetween and thereby to provide a variable amount of impact load that needs to be applied to the shear tabs shear tabs before the shear tabs shear. The shapes and constructions of shear tabs 151, 152, 153 shown in FIG. 7A are only examples. Different number of shear tabs and other shapes and constructions are possible.

Figure 7B:
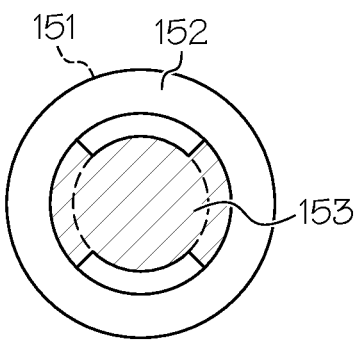
FIG. 7B shows the shear tabs of FIG. 7A fully overlapping.
Figure 7C:
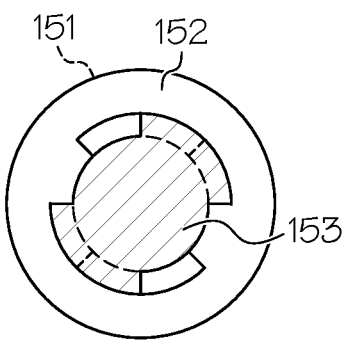
FIG. 7C shows the shear tabs of FIG. 7A approximately half overlapping.

FIG. 7B shows adjustable third shear tab 153 fully overlapping with first and second shear tabs 151, 152. FIG. 7C shows adjustable third shear tab 153 approximately half overlapping with first and second shear tabs 151, 152. Third shear tab 153 can adjusted in a continuum from non-overlapping (i.e., no overlap of third shear tab 153 with first and second shear tabs 151, 152) to fully overlapping (as shown in FIG. 7B). Thus, the load setting of the three shear tabs 151, 152, 153 can be adjusted in a continuum from a minimum load setting (i.e., no overlap of third shear tab 153 with first and second shear tabs 151, 152) to a maximum load setting (i.e., full overlap of third shear tab 153 with first and second shear tabs 151, 152).

Referring to FIGS. 5 and 6, servomotor 154 is drivingly connected to gear wheel 156 that has gear teeth 157 meshingly engaged with gear teeth 141 of shear collar 140. Servomotor 154 operates in either direction to rotate gear wheel 156 which, in turn, rotates shear collar 140. When shear collar 140 is rotated, the position of shear collar 140 moves relative to the positions of the three shear tabs 151, 152, 153. The shearing force capability of the three shear tabs 151, 152, 153 depends upon the extent of rotation of shear collar 140 relative to the three shear tabs 151, 152, 153. The shearing force capability of the three shear tabs 151, 152, 153 also determines the load setting of suspension element 114. The load setting of suspension element 114 depends upon the extent of rotation of shear collar 140 by servomotor 154 relative to the three shear tabs 151, 152, 153. Thus, the load setting of suspension element 114 can be adjusted in a continuum from a minimum load setting to a maximum load setting depending upon the extent of rotation of shear collar 140 relative to the three shear tabs 151, 152, 153.

Figure 8:
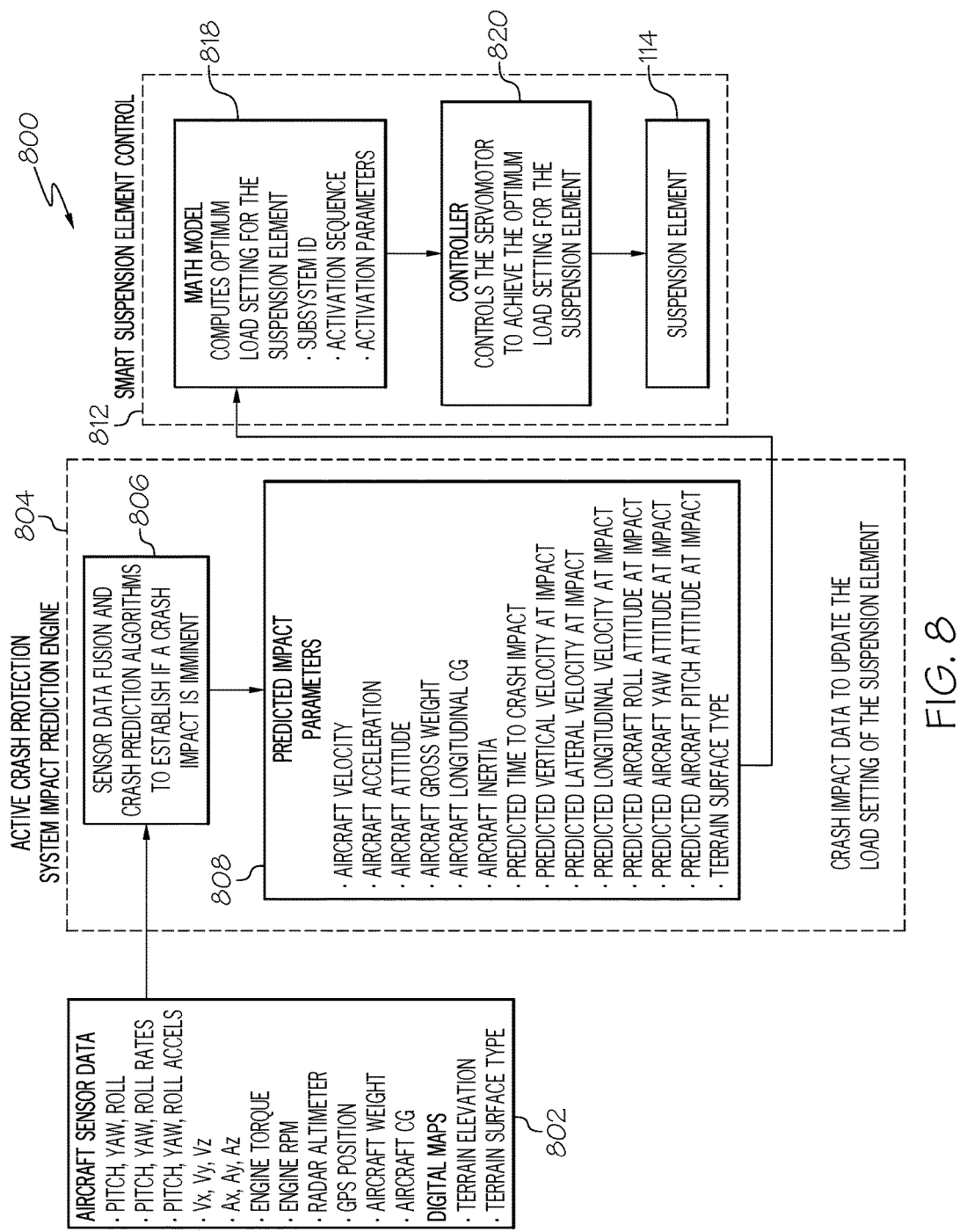
FIG. 8 is a schematic overview of an example architecture of an example implementation of example vehicle load-limiting suspension apparatus disclosed herein.

Referring to FIG. 8, a schematic overview of an example architecture 800 of one example implementation of a vehicle load-limiting suspension apparatus including suspension element 114 of FIGS. 5 and 6 is illustrated. The example architecture 800 includes input data 802, which may be provided from sensor/sensor systems and/or flight control systems, an ACPS impact prediction engine 804, which includes sensor data fusion and crash prediction algorithms 806 and predicted impact parameters (e.g., predicted impact conditions) 808, and smart suspension element control 812. Smart suspension element control 812 of the illustrated example includes suspension element math model 818, servomotor controller 820, and suspension element 114.

In operation, input data 802 of the illustrated example is provided to ACPS impact prediction engine 804 (e.g., sensor data fusion and crash prediction algorithms 806 of ACPS impact prediction engine 804). Input data 802 may include, but is not limited to, pitch (position, rates, acceleration), yaw (position, rates, acceleration), roll (position, rates, acceleration), velocity, velocity vector components, acceleration, acceleration vector components, engine torque, engine rotations per minute (RPM), radar altimeter, global positioning system (GPS) position, aircraft weight and/or aircraft center of gravity (CG), etc. Additionally or alternatively, in some examples, input data 802 also includes digital map data that includes terrain elevation (e.g., elevation related to current altitude, etc.) and/or terrain surface type/topography.

Example ACPS impact prediction engine 804 predicts impact parameters 808 based on input data 802. In this example, ACPS impact prediction engine 804 calculates predicted impact parameters based on input data 802. Predicted impact parameters 808 may include aircraft velocity (e.g., aircraft velocity at impact), aircraft acceleration, aircraft attitude (e.g., aircraft attitude at impact), aircraft gross weight (e.g., aircraft weight after fuel burn, etc.), aircraft longitudinal CG, and aircraft inertia.

Other predicted impact parameters 808 may include time to crash, vertical velocity at impact, lateral velocity at impact, longitudinal velocity at impact, aircraft roll attitude at impact, aircraft yaw attitude at impact, aircraft pitch attitude at impact, and terrain surface type/topography. These are only examples of predicted impact parameters. Other predicted impact parameters are possible.

In this example, smart suspension element control 812 receives predicted impact parameters from ACPS impact prediction engine 804. In particular, suspension element math model 818 receives predicted impact parameters 808. As a result, suspension element math model 818 then computes an optimum load setting for suspension element 114. The optimum load setting is provided to servomotor controller 820 which, in turn, controls suspension element 114 based upon the optimum load setting. Thus, the optimum load setting for suspension element 114 is provided based upon predicted impact parameters 808.

Figure 9:
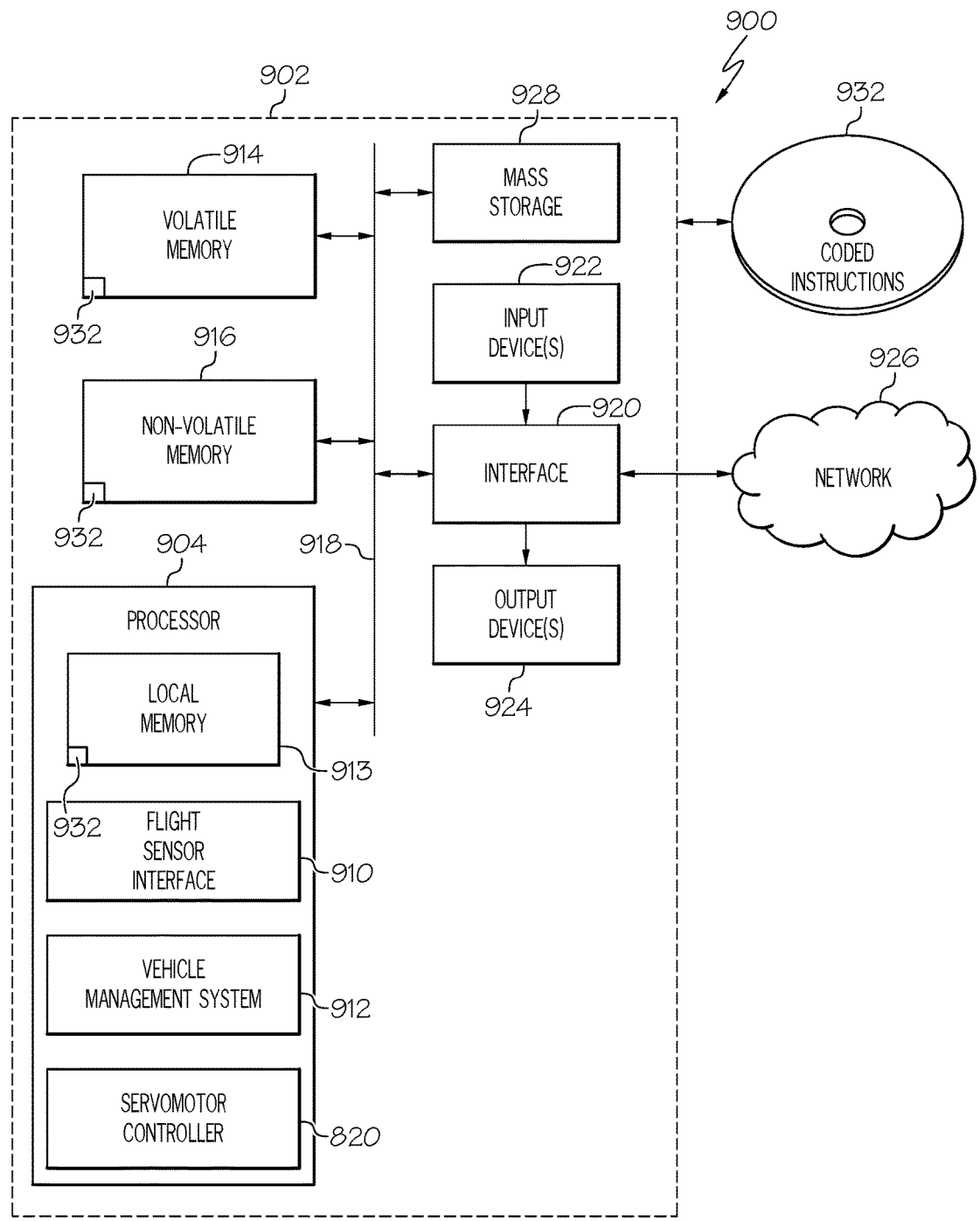
FIG. 9 is an example control system that may be used to implement example architecture of FIG. 8.

Referring to FIG. 9, an example control system 900 that may be used to implement the example architecture 800 of FIG. 8 is illustrated. Example control system 900 includes an example processor platform 902 capable of executing instructions to implement a control method to implement the control system 900. The processor platform 902 can be, for example, a server, a personal computer, a mobile device (e.g., a cell phone, a smart phone, a tablet such as an iPad™), a personal digital assistant (PDA), a personal video recorder, a set top box, or any other type of computing device.

The processor platform 902 of the illustrated example includes a processor 904. The processor 904 of the illustrated example is hardware. For example, the processor 904 can be implemented by one or more integrated circuits, logic circuits, microprocessors or controllers from any desired family or manufacturer.

The processor 904 of the illustrated example includes an ACPS flight sensor interface 910 and/or an ACPS vehicle management system 912. The flight sensor interface 910 is coupled to ACPS vehicle management system 912 (e.g., sensor communication systems, flight instrumentation, etc.). The processor 904 also includes a local memory 913 (e.g., a cache), and the servomotor controller 820.

The processor 904 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 902 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 904. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.).

The processor platform 902 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement a control method may be stored in the mass storage device 928, in the volatile memory 914, in the non-volatile memory 916, and/or on a removable tangible computer readable storage medium such as a CD or DVD.

Figure 10:
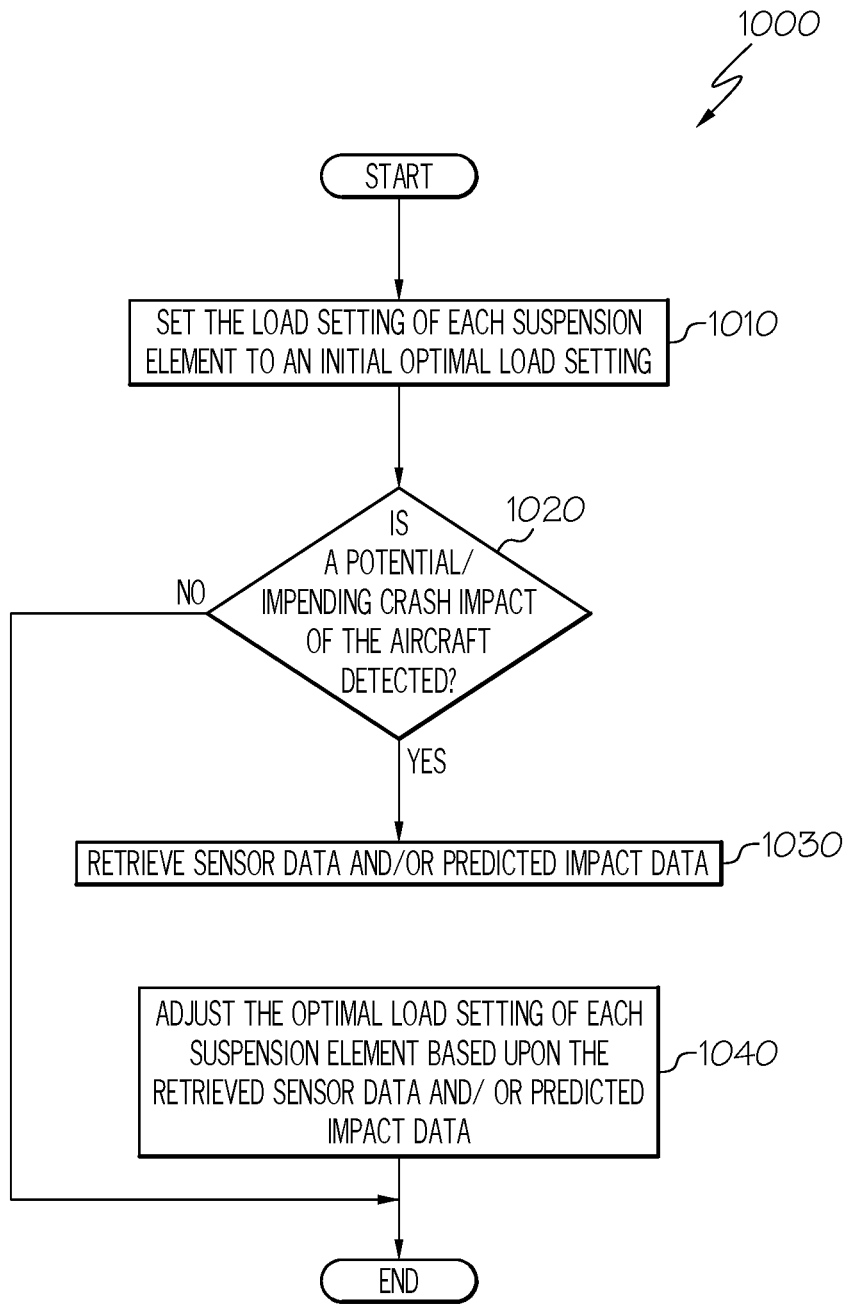
FIG. 10 is a flow diagram depicting an example control method that may be used to implement examples disclosed herein.

A flowchart 1000 representative of an example control method for implementing the example control system 900 of FIG. 9 is shown in FIG. 10. In this example, the control method may be implemented using machine readable instructions that comprise a program for execution by a processor such as the processor 904 shown in the example processor platform 902 discussed above in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 904, but the entire program and/or parts thereof could alternatively be executed by a device other than the processor 904 and/or embodied in firmware or dedicated hardware. Further, although the example program is described with reference to the flowchart illustrated in FIG. 10, many other methods of implementing the example control system 900 may alternatively be used. For example, the order of execution of the blocks may be changed, and/or some of the blocks described may be changed, eliminated, or combined.

As mentioned above, the example control method of FIG. 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

Additionally or alternatively, the example control method of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

In the example control method of FIG. 10, the load setting of each suspension element (e.g., the suspension element 114) is set to the optimum load setting based upon nominal impact parameters 808 (block 1010). For example, a servomotor controller (e.g., the servomotor controller 820) directs a motor assembly (e.g., the servomotor 154) to adjust each respective suspension element (e.g., the suspension element 114) to the optimum load setting. In some examples, the optimum load setting for the suspension element 114 is set to the optimum load setting prior to takeoff of the aircraft.

Next, a determination is made as to whether a potential/impending crash impact of the aircraft is detected (block 1020). For example, flight instrumentation/control systems of the aircraft such as the example ACPS vehicle management system 912 may provide an alert/data related to a servomotor controller such as the servomotor controller 820 based on an impending impact and/or parameters (e.g., calculated parameters) pertaining to the detected and/or predicted impact.

If it is determined that an impact (e.g., an imminent impact) is not predicted to occur (block 1020), the process ends. However, if it is determined that a potential impact is detected (block 1020), sensor data and/or predicted impact data are retrieved from a flight interface (e.g., the ACPS flight sensor interface 910) by a suspension element controller such as the servomotor controller 820, for example (block 1030). Next, the optimum load setting for each respective suspension element (e.g., the suspension element 114) is adjusted based on the sensor data and/or the predicted impact data (block 1040) and the process ends. In some examples, the impact data is calculated and/or predicted based on current flight conditions.

In some other examples, the servomotor controller 820 determines the optimum load setting of the suspension element 114 based on flight data (e.g., predicted impact data, flight parameters, aircraft gross weight etc.) received via the ACPS flight sensor interface 910.

While an example manner of implementing the example control system 900 is illustrated in FIG. 9, one or more of the elements, processes and/or devices illustrated in FIG. 9 may be combined, divided, re-arranged, omitted, eliminated and/or implemented in any other way. Further, the example ACPS flight sensor interface 910, the example servomotor controller 820, the example ACPS vehicle management system 912 and/or, more generally, the example control system 900 of FIG. 9 may be implemented by hardware, software, firmware and/or any combination of hardware, software and/or firmware. Thus, for example, any of the example ACPS flight sensor interface 910, the example servomotor controller 820, the example ACPS vehicle management system 912 and/or, more generally, the example control system 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example ACPS flight sensor interface 910, the example servomotor controller 820, and/or the example ACPS vehicle management system 912 is/are hereby expressly defined to include a tangible computer readable storage device or storage disk such as a memory, a digital versatile disk (DVD), a compact disk (CD), a Blu-ray disk, etc. storing the software and/or firmware.

It should be apparent that the above-disclosed three shear tabs 151, 152, 153 are provided for controlling load (i.e., controlling load setting) applied to suspension element 114, and crush tube 130 is provided for limiting load applied to suspension element 114. During normal flight and normal landing, the normal loads (i.e., the impact load from normal flight and normal landing) are transmitted through shear tabs 151, 152, 153. However, during hard landing or crash impacts that exceed normal loads, shear tabs 151, 152, 153 will shear at loads depending upon the load setting of suspension element 114. As mentioned, the load setting of suspension element 114 depends upon the extent of rotation of shear collar 140 relative to shear tabs 151, 152, 153. Accordingly, the load level to activate suspension element 114 (i.e., to activate shearing of shear tabs 151, 152, 153) depends upon the extent of rotation of shear collar 140 relative to shear tabs 151, 152, 153.

After shear tabs 151, 152, 153 have sheared, crush tube 130 provides the load limiting function (i.e., the energy absorbing function) of suspension element 114. More specifically, crush tube 130 is displaced (i.e., crushed). The crush load of crush tube 130 is relatively constant as crush tube 130 is being crushed. The crushing capability of crush tube 130 is uniform at near constant load levels. The crush energy absorbing capability of suspension element 114 depends upon the number of crush tubes used. The crush energy absorbing capability of suspension 114 increases linearly with the number of crush tubes used. Accordingly, the one or more crush tubes function as a load-limiting mechanism that is fully scalable to achieve the desired load limiting levels required by different applications.

It should also be apparent that suspension element 114 is actively controlled in that the load setting of suspension element 114 is actively controlled. The load setting can be actively controlled to provide an optimum load setting. By optimizing the load setting of suspension element 114, operational durability of the aircraft and crash survivability of the aircraft occupants are improved. For example, in the example transmission support structure 110 shown in FIG. 4, airframe damage is reduced and occupant survivability during hard landing and crash impacts is increased. Moreover, since airframe damage is reduced, aircraft parts including airframe components can be designed with less durability and therefore less weight. Accordingly, the overall weight of the aircraft can be reduced.

It should further be apparent that suspension element 114 shown in FIG. 4 is flexible and able to control and limit loads applied between aircraft fuselage 116 and plate 118, whereas known element 14 shown in FIG. 3 is rigid and unable to control and limit loads applied between aircraft fuselage 16 and plate 18.

Although the above-description describes an example vehicle load-limiting suspension apparatus and an example control method for aircraft in the aviation industry in accordance with FAA regulations and military specifications, it is contemplated that vehicle load-limiting suspension apparatus and control methods may be implemented for any industry in accordance with the applicable industry standards.

Figures 11, 12:
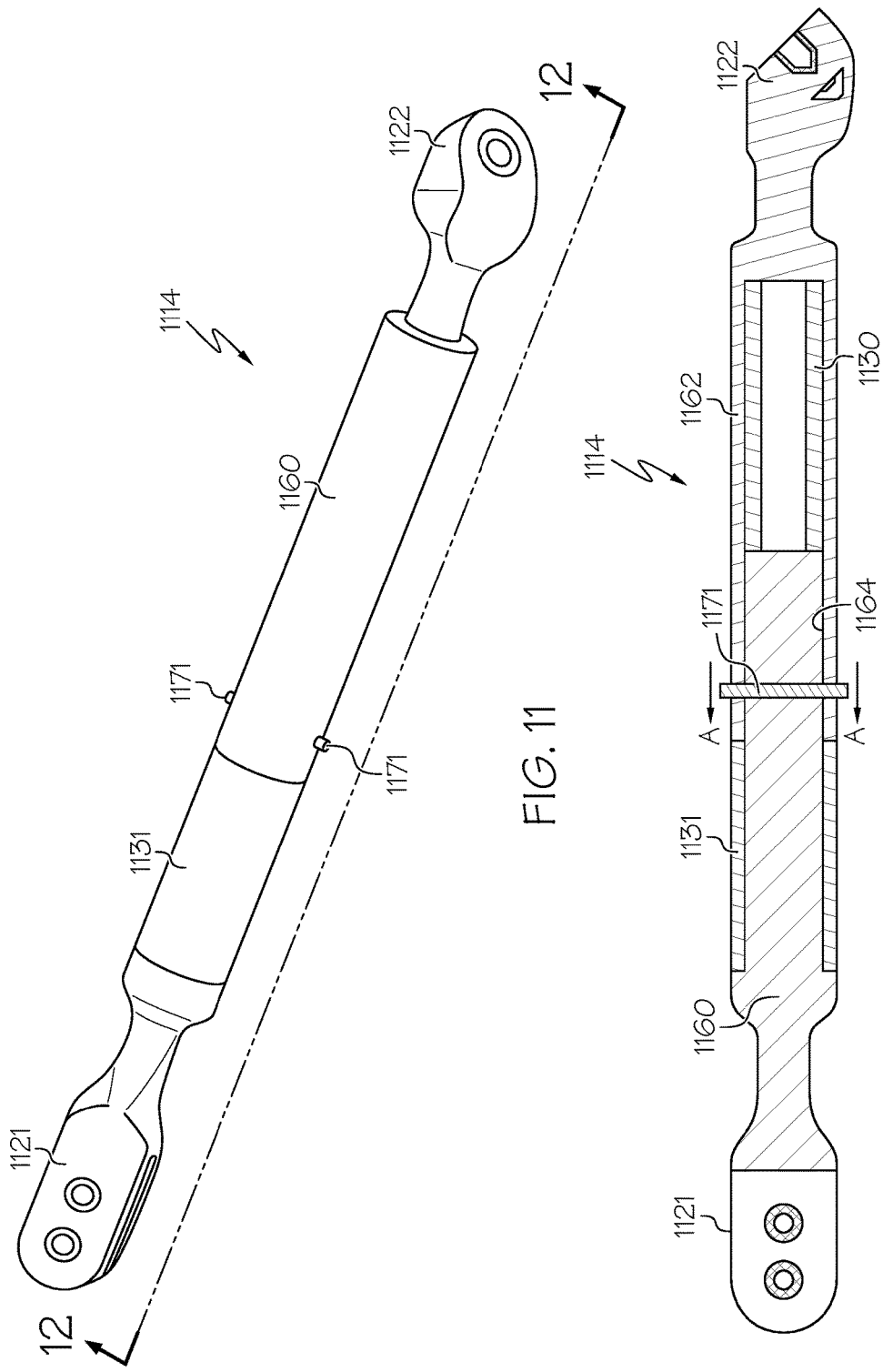
FIG. 11 is a perspective view of a load-controlled suspension element constructed in accordance with another embodiment.
FIG. 12 is a sectional view taken approximately along line 12-12 shown in FIG. 11.

Referring to FIG. 11, a perspective view of a suspension element 1114 constructed in accordance with another embodiment is illustrated. FIG. 12 is a sectional view taken approximately along line 12-12 shown in FIG. 11. Suspension element 1114 includes first end portion 1121 and second end portion 1122. First end portion 1121 and second end portion 1122 may comprise aluminum, steel, titanium, or fiber-reinforced composite materials. These materials are only examples. Other materials are possible. It is conceivable that both first and second end portions 1121, 1122 comprise the same material.

One end of rod portion 1160 is connected to first end portion 1121. The other end of rod portion 1160 extends in central opening 1164 at one end of housing portion 1162. The other end of housing portion 1162 is connected to second end portion 1122. First crush tube 1130 is disposed in central opening 1164 of housing portion 1162. One end of first crush tube 1130 abuts against rod portion 1160, and the other end first crush tube 1130 abuts against housing portion 1162. Second crush tube 1131 is disposed on an outer circumferential surface of housing portion 1160. One end of second crush tube 1131 abuts against first end portion 1121. The other end of second crush tube 1131 abuts against housing portion 1162.

Each of first and second crush tubes 1130, 1131 may be formed from various materials or combinations of materials. As an example, each of first and second crush tubes 1130, 1131 may comprise fiber-reinforced composite material. It is conceivable that material or first crush tube 1130 and material of second crush tube 1131 may be different from each other.

Shear bolt 1171 passes through housing portion 1162 and rod portion 1160, as best shown in FIG. 12. When a crushing impact load is applied between first and second end portions 1121, 1122 of suspension element 1114, a shearing force in the direction of arrow "A" is applied to shearing bolt 1171. The impact energy at which shear bolt 1171 shears depends upon a number of factors including thickness, length, and material composition of shear bolt 1171.

Although only one shear bolt is used in FIGS. 11 and 12, it is conceivable that more than one shear bolt be used. The impact load that can be applied to suspension element 1114 before the one or more shear bolts shear varies linearly with the number of shear bolts used. The load setting of suspension element 1114 depends upon the number of shear bolts used. Accordingly, the one or more shear bolts function as a load control mechanism that is fully scalable to achieve the desired load levels required by different applications.

After shear bolt 1171 is sheared, both first and second crush tubes 1130, 1131 are crushed. As each of first and second crush tubes 1130, 1131 are being displaced (i.e., crushed), the crush load of each crush tube is relatively constant. The crushing capability is uniform at near constant load levels. The crush energy absorbing capability of suspension element 1114 depends upon the number of crush tubes used. The crush energy absorbing capability of suspension 1114 increases linearly with the number of crush tubes used. Accordingly, the one or more crush tubes function as a load-limiting mechanism that is fully scalable to achieve the desired load limiting levels required by different applications.

Although various embodiments of the disclosed vehicle load-limiting suspension apparatus and control methods have been shown and described, modifications may occur to those skilled in the art upon reading the specification. The present application includes such modifications and is limited only by the scope of the claims.

What is claimed is:

1. A method comprising:
controlling an amount of impact load applied to a vehicle structure during a vehicle impact event, wherein controlling the amount of impact load applied to the vehicle includes controlling an amount of load applied to at least one support tube; and limiting the amount of the impact load applied to the vehicle structure while an impact energy of the vehicle impact event is being absorbed, wherein limiting the amount of the impact load applied to the vehicle structure includes crushing at least one crush tube, the at least one crush tube comprising a composite material, wherein one of the at least one support tube and the at least one crush tube is disposed within the other of the at least one support tube and the at least one crush tube, wherein the at least one crush tube comprises a first end and a second end opposite the first end, wherein the first end is abutted by a first surface and the second end is abutted by a second surface, and wherein the at least one crush tube is crushed by a displacement of the first surface towards the second surface.

2. The method according to claim 1 wherein controlling the amount of impact load applied to the vehicle structure includes shearing at least one shear tab.

3. The method according to claim 1 further comprising: scaling the impact load controlled, or scaling the impact load limited, or both.

4. The method according to claim 1 wherein the method is performed by a computer having a memory executing one or more programs of instructions which are tangibly embodied in a program storage medium readable by the computer.

5. The vehicle structure to which the impact load is controlled and limited in accordance with the method of claim 1.

6. The vehicle structure of claim 5 wherein the impact load is controlled by at least one shear tab and is limited by the at least one crush tube.

7. A vehicle load-limiting suspension apparatus comprising:

at least one support tube and at least one shear tab for controlling an amount of impact load applied to a vehicle structure when a vehicle impact event occurs; and at least one crush tube for limiting the amount of the impact load applied to the vehicle structure after the at least one shear tab shears in response to occurrence of the vehicle impact event, the at least one crush tube comprising a composite material, wherein one of the at least one support tube and the at least one crush tube is disposed within the other of the at least one support tube and the at least one crush tube, wherein the at least one crush tube comprises a first end and a second end opposite the first end, wherein the first end is abutted by a first surface and the second end is abutted by a second surface, and wherein the at least one crush tube is crushed by a displacement of the first surface towards the second surface.

8. The vehicle load-limiting suspension apparatus according to claim 7 wherein the at least one shear tab includes at least two shear tabs that overlap each other to provide variable engagement therebetween and thereby to provide a variable amount of the impact load that needs to be applied to the at least two shear tabs before the shear tabs shear.

9. The vehicle load-limiting suspension apparatus according to claim 8 further comprising a servomotor operatively connected to the at least two shear tabs that overlap each other, and a servomotor controller for computing an optimum load setting.

10. The vehicle load-limiting suspension apparatus according to claim 9 wherein the at least one crush tube absorbs the impact energy to limit the amount of the impact load applied to the vehicle structure after the at least two shear tab shear in response to occurrence of the vehicle impact event.

11. The vehicle load-limiting suspension apparatus according to claim 10 further comprising a plurality of sensors for detecting an impending vehicle impact event, wherein the plurality of sensors includes one or more of:

pitch position, pitch rates, pitch acceleration, yaw position, yaw rates, yaw acceleration, roll position, roll rates, roll acceleration, velocity, velocity vector components, acceleration, acceleration vector components, engine torque, engine rotations per minute (RPM), radar altimeter, global positioning system (GPS) position, aircraft weight, and aircraft center of gravity (CG).

12. The vehicle load-limiting suspension apparatus according to claim 11 wherein the plurality of sensors includes digital map data that includes terrain elevation.

13. A vehicle load-limiting suspension apparatus comprising:

a suspension element having a first portion connectable to a fixed portion of a vehicle structure and having a second portion connectable to a movable portion of the vehicle structure, wherein the suspension element includes a shear collar and at least two shear tabs;

a plurality of sensors for detecting an impending vehicle impact event; and a servomotor rotating the shear collar relative to the at least two shear tabs to vary a lead setting of a load applied between the first portion and the second portion of the suspension element based upon data from the plurality of sensors.

14. The vehicle load-limiting suspension apparatus according to claim 13 wherein the suspension element includes at least one crushable tube.

15. The vehicle load-limiting suspension apparatus according to claim 14 wherein the servomotor is operatively connected to the at least two shear tabs, and the vehicle load-limiting suspension apparatus further comprises a servomotor controller for computing the optimum load setting of the suspension element.

16. The vehicle load-limiting suspension apparatus according to claim 13 wherein the plurality of sensors includes one or more of:

pitch position, pitch rates, pitch acceleration, yaw position, yaw rates, yaw acceleration, roll position, roll rates, roll acceleration, velocity, velocity vector components, acceleration, acceleration vector components, engine torque, engine rotations per minute (RPM), radar altimeter, global positioning system (GPS) position, aircraft weight, and aircraft center of gravity (CG).

17. The vehicle load-limiting suspension apparatus according to claim 13 wherein the plurality of sensors includes digital map data that includes terrain elevation.

18. The vehicle load-limiting suspension apparatus according to claim 13 wherein the plurality of sensors includes digital map data that includes terrain surface type, terrain surface topography, or both.

19. The vehicle load-limiting suspension apparatus according to claim 13 wherein the suspension element provides for a continuously variable amount of impact load applied to a vehicle structure during a vehicle impact event.

20. The vehicle load-limiting suspension apparatus according to claim 7, wherein the at least one crush tube includes a plurality of concentric crush tubes.

21. The vehicle load-limiting suspension apparatus according to claim 7, wherein the at least one crush tube includes a chamfered portion.

22. The method according to claim 1 wherein the at least one crush tube includes a plurality of concentric crush tubes.

* * * * *